US011897251B2

(12) United States Patent
Koch et al.

(10) Patent No.: US 11,897,251 B2
(45) Date of Patent: Feb. 13, 2024

(54) SHEET-FED PRINTING PRESS HAVING A DRYER FOR DRYING SHEETS PRINTED BY A NON-IMPACT PRINTING DEVICE

(71) Applicant: KOENIG & BAUER AG, Würzburg (DE)

(72) Inventors: Annemarie Koch, Dresden (DE); Heinz Michael Koch, Dresden-Cossebaude (DE); Maik Walter, Dresden (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/272,251

(22) PCT Filed: Aug. 11, 2022

(86) PCT No.: PCT/EP2022/072506
§ 371 (c)(1),
(2) Date: Jul. 13, 2023

(87) PCT Pub. No.: WO2023/041262
PCT Pub. Date: Mar. 23, 2023

(65) Prior Publication Data

US 2023/0391070 A1 Dec. 7, 2023

(30) Foreign Application Priority Data

Sep. 14, 2021 (DE) ..................... 10 2021 123 675.4

(51) Int. Cl.
*B41F 23/04* (2006.01)

(52) U.S. Cl.
CPC ................................ *B41F 23/0483* (2013.01)

(58) Field of Classification Search
CPC .................................................. B41F 23/0483
See application file for complete search history.

(56) References Cited

U.S. PATENT DOCUMENTS 3,318,018 A 5/1967 Steele et al.
6,176,184 B1 1/2001 Mudry
(Continued)

FOREIGN PATENT DOCUMENTS

CN 110884263 A 3/2020
DE 1293163 B 4/1969
(Continued)

OTHER PUBLICATIONS

International Search Report of PCT/EP2022/072506 dated Nov. 28, 2022.

*Primary Examiner* — David H Banh
(74) *Attorney, Agent, or Firm* — MATTINGLY & MALUR, PC

(57) ABSTRACT

In some examples, a sheet-fed printing press includes a dryer for drying sheets printed by a non-impact printing device. A cooling unit is directly downstream from the dryer in the transport direction, and includes a cooling module above a conveying plane. The cooling module uses air as a cooling medium, and may include a blower module with blower nozzles that blow the cooling medium onto the surface of the sheets being cooled. The blower module forms, with a guide surface, a gap with respect to the surface of the sheet being cooled. The guide surface of the blower module is arranged at a height above the surface of the sheet being cooled so that the cross-section of an outer annular gap, through the cooling medium exits, is smaller than or almost equal to a sum cross-section across all opening surfaces of the blower nozzles in the guide surface.

15 Claims, 8 Drawing Sheets

(56) References Cited

U.S. PATENT DOCUMENTS

| | | | | |
|---|---|---|---|---|
| 9,440,459 | B1 * | 9/2016 | Fromm ...................... | B41J 2/01 |
| 2008/0084465 | A1 | 4/2008 | Telken | |
| 2009/0021549 | A1 * | 1/2009 | Muto ................... | B41J 11/0022 347/16 |
| 2010/0022764 | A1 * | 1/2010 | Otoshi .................. | B29C 55/143 536/63 |
| 2010/0192782 | A1 | 8/2010 | Blumenauer et al. | |
| 2012/0162304 | A1 | 6/2012 | Fujikura | |
| 2014/0002559 | A1 * | 1/2014 | Taya .................... | B41J 11/0022 347/102 |
| 2014/0150285 | A1 * | 6/2014 | Bucks ....................... | F26B 5/02 34/279 |
| 2015/0117922 | A1 | 4/2015 | Huijbers et al. | |
| 2017/0355201 | A1 | 12/2017 | Hojo et al. | |
| 2019/0337310 | A1 * | 11/2019 | Praharaj ............... | B41J 11/0022 |
| 2020/0122492 | A1 | 4/2020 | Campbell et al. | |

FOREIGN PATENT DOCUMENTS

| | | | |
|---|---|---|---|
| DE | 3943466 | A | 8/1991 |
| DE | 9313212 | U1 | 11/1993 |
| DE | 102011009693 | A1 | 8/2012 |
| DE | 102016207397 | A1 | 11/2017 |
| EP | 2463100 | A1 | 6/2012 |
| EP | 3945371 | A1 | 2/2022 |
| JP | 07-186368 | A | 7/1995 |
| JP | 2015-039867 | A | 3/2015 |
| JP | 2015155091 | A | 8/2015 |

* cited by examiner

SHEET-FED PRINTING PRESS HAVING A DRYER FOR DRYING SHEETS PRINTED BY A NON-IMPACT PRINTING DEVICE

CROSS-REFERENCES TO RELATED APPLICATIONS

This application is the US national phase, under 35 USC § 371, of PCT/EP2022/072506, filed on Aug. 11, 2022, published as WO 2023/041262 A1 on Mar. 23, 2023, and claiming priority to DE 10 2021 123 675.4, filed Sep. 14, 2021, and all of which are expressly incorporated by reference herein in their entireties.

TECHNICAL FIELD

Examples herein relate to a sheet-fed printing press comprising a dryer drying sheets printed by a non-impact printing device. The dryer is configured as a hot air dryer and/or as a dryer drying by infrared (IR) radiation, and a cooling unit is arranged directly downstream from the dryer in the transport direction of the sheets. The cooling unit includes at least one cooling module above a conveying plane in which the sheets are conveyed through the cooling unit lying flat. The cooling module may be configured to use air as the cooling medium.

BACKGROUND

The machine system described hereafter forming a sheet-fed printing press for processing sheet-format substrates (hereafter referred to as sheets for short) comprises multiple machine units arranged consecutively in the transport direction of the sheets, wherein at least one of these machine units comprises a transport device transporting the sheets in each case along a linear transport section. This transport device is preferably configured as at least one conveyor belt on which the sheets are consecutively transported, resting individually thereon. While the individual sheets rest on the at least one conveyor belt, each sheet is held at the relevant conveyor belt in a friction-fit or force-fit manner by a suction force, i.e., by a retaining force caused by a suction flow. The suction force is generally achieved by a vacuum pressure that engages on the particular sheet and is adjusted with respect to the ambient atmospheric pressure by means of a suction device.

Such a transport device is arranged in the sheet-processing machine system, amongst others, in a dryer drying the sheets. The dryer is thus in particular configured as a continuous-flow dryer for sheets in individual layers. The dryer is followed by a cooling unit for controlling the climate and/or air conditioning the sheets heated in the dryer. A suction belt feed table, for example, is arranged subsequent to the cooling unit.

A sheet stacking device is known from JP 2015 039867 A, which is able to prevent flapping of a sheet, while cooling the sheet using a simple design. For this purpose, air is blown in the horizontal direction by multiple nozzles, which are separated in the vertical direction, toward a side surface of a sheet bundle so as to form a clearance between multiple sheets of an intermediate part of sheet bundles stacked in the vertical direction on a paper discharge tray. The air is passed between the sheets of the sheet bundle. As a result, the multiple sheets of the intermediate part in the vertical direction of the sheet bundle can be cooled.

A dryer for drying printing ink applied to a material web by a printing press is known from U.S. Pat. No. 6,176,184 B1, comprising a casing having an air plenum and a plurality of orifices via which the air plenum communicates with the exterior surrounding the casing, wherein the casing can be arranged in such a way that the orifices are adjacent to the material web, a source of pressurized air, an air passage for conveying pressurized air from the source of pressurized air to the air plenum, and an electrical heater in the air passage for heating the air as it flows from the source of pressurized air to the air plenum.

An air dryer tunnel is known from US 2008/084465 A1, comprising an impingement section, including an air inlet, and a corrugated impingement nozzle shroud including rows of orifices positioned at at least one of the apexes, or proximate to apexes, of the corrugation of the nozzle shroud, wherein the orifices are in fluid communication with the air inlet, and an exhaust section, including an exhaust air outlet in fluid communication with the orifices of the impingement nozzle shroud.

A sheet-fed printing press comprising a dryer drying sheets printed by a non-impact printing device is known from DE 10 2016 207 397 A1.

A cooling module for cooling substrates is known from DE 10 2011 009 693 A1, in particular solar cells printed with a paste after passing through a heating module, wherein the cooling module comprises the following: an elongated cooling chamber having an inlet opening adjacent to the heating module, and an outlet opening; a transport unit for transporting substrates through the elongated cooling chamber, wherein the transport unit defines a transport plane for the substrates; at least one first cooling unit, including a multiplicity of first plate elements, which each extend substantially perpendicularly to and above the transport plane in the cooling chamber; at least one first conduit, which extends through the first plate elements and is in a thermally conducting relationship therewith, and at least one delivery unit for conducting a cooling fluid through the first conduit; and a delivery unit for conducting gas, in particular air, via spaces between the plate elements in the direction of the transport plane, wherein at least one second cooling unit is provided, including a multiplicity of second plate elements, which each extend substantially perpendicularly to and beneath the transport plane in the cooling chamber, at least one second conduit, which extends through the second plate elements and is in a thermally conducting relationship therewith, and at least one delivery unit for conducting a cooling fluid through the second conduit.

A device for guiding an elongated material web through a space of a system having a limited height, comprising a retaining element for gripping the feed end of the material web, is known from DE 93 13 212 U1.

A cooling device for a sheet-fed printing press can be derived from DE 39 43 466 A1, wherein this cooling device comprises a conveyor belt and is arranged so as to be foldable in a frame.

A device for drying printing ink on a web-format material to be printed, in particular a paper web, is known from DE 12 93 163 A, wherein this device comprises a cooling zone following a heating zone, in which cooling air is directed towards the material to be printed by means of a fan, and the consumed air is discharged, wherein the cooling zone is formed by a hood and a plenum chamber that is arranged within this hood, spaced inwardly of the walls thereof on all sides, and that comprises an orifice plate directing the cooling air towards the material to be printed, wherein the air supply duct leads through the top wall of the hood into the plenum chamber, and the air exhaust duct is connected to the hood.

A sheet-processing machine, in particular a sheet-fed printing press, comprising a varnishing unit and one or more combination dryers, is known from EP 2 463 100 A1, wherein the combination dryers apply both radiation energy and heated air to the newly varnished sheet, wherein the combination dryers include a multiplicity of circular or polygonal air nozzles, between which narrow-band high-power infrared light sources are arranged, which apply a total irradiation density of at least 25 kW/m 2 to the varnished sheet, wherein the temperature of the heated air passing through the nozzles is less than 100° C., preferably less than 80° C.

A transport device is known from the post-published EP 3 945 371 A1, comprising a transport unit, which transports a sheet-format transport material without holding a one-end-side portion of the transport material in a transport direction, and a blowing unit, which blows air against a lower surface of the transport material that is transported by the transport unit through a multiplicity of blowing holes that open with respect to the lower surface, wherein an arrangement interval of the multiplicity of blowing holes in the transport direction is inconstant in the transport direction.

An image-forming device is known from US 2020/0 122 492 A1, comprising an endless transport belt for moving a sheet through the image-forming device, a vacuum plenum for applying vacuum pressure through the transport belt, wherein the vacuum plenum holds the sheet to the conveyor belt by a vacuum drawing air through the transport belt; and a drive roller or an idle roller for supporting the transport belt over the vacuum plenum, wherein the roller includes a hollow inner channel, which extends along an axial region of the roller; an outer surface, which is a running surface for the transport belt; a first end, which provides an air intake hole for the hollow inner channel, wherein the air intake hole is used to receive air from an air source; and perforations, which are formed through a drum wall in the roller, wherein the perforations allow air pressure to be discharged from the hollow inner channel toward the transport belt, wherein the air diffuses through the transport belt to detach a sheet from the transport belt, and a baffle, which is defined as a screen conforming to at least a circumferential portion of the outer surface of the roller, wherein the baffle is slideable relative to the outer surface between at least two positions so as to control an air flow toward the transport belt.

An image-forming device is known from US 2017/0 355 201 A1, comprising: a medium transport portion, which transports a medium in a medium transport direction; an ink jet printing portion, which forms images on the medium being transported, using ink; a varnish application portion, which applies an aqueous varnish to the medium on which the images were formed; a treatment portion, which carries out a heating and drying treatment on the medium in such a way that a stickiness evaluation value of 0.24 or less is reached, which is the stickiness evaluation value indicating a degree of stickiness of the aqueous varnish that was applied to the medium when the medium to which the aqueous varnish was applied is output from the varnish application portion, and which is derived using a damped vibration percentage of a pendulum, which is induced to carry out pendulum motions from an arbitrary location of the medium to which the aqueous varnish was applied as a pivot; and an accumulation portion, which accumulates the medium to which the aqueous varnish was applied, using the varnish application portion, and on which the treatment was carried out, using the treatment portion, furthermore comprising a first temperature detection portion, which is arranged at a location on a downstream side of the printing portion in the medium transport direction and at a location on an upstream side of the varnish application portion in the medium transport direction and detects temperatures of the medium on which the images were formed, using the printing portion, and to which the aqueous varnish is to be applied, using the varnish application portion, wherein the treatment portion includes a drying treatment portion, which is arranged at a location on the downstream side of the printing portion in the medium transport direction and at a location on the upstream side of the varnish application portion in the medium transport direction and carries out a drying treatment on the medium on which the images were formed, using the printing portion, and to which the aqueous varnish is to be applied, using the varnish application portion, and a drying treatment control portion, which controls temperatures of the medium on which the drying treatment is carried out, using the drying treatment portion, by employing drying conditions under which the stickiness evaluation value of the medium to which the aqueous varnish is to be applied, using the varnish application portion, reaches 0.24 or less, and wherein the treatment portion includes a powder spraying portion, which is adapted to spray powder onto the medium that was treated using the treatment portion, and a powder spraying control portion, which sprays powder onto the medium that was treated using the treatment portion, using the powder spraying portion when the detected temperatures of the medium are lower than 101° C., using the first temperature detection portion.

A system is known from US 2015/0 117 922 A1, comprising the following: an image-forming device, which comprises a processing stage configured to cause media sheets to be heated; and a device for treating media sheets after an image has been formed on the media sheets by the image-forming device, wherein the device for treating media sheets is arranged on a discharge side of the image-forming device and comprises the following: a perforated conveying and support substrate, which is arranged so as to convey the media sheets through a stabilization zone in which the conveying and support substrate has a limited curvature; a suction device, which is configured to apply a vacuum to the perforations of the conveying and support substrate in the stabilization zone so as to suck the media sheets against the conveying and support substrate, and a cooling system, which is arranged for actively cooling the media sheets while the media sheets are sucked against the conveying and support substrate in the stabilization zone, wherein the stabilization zone includes an entry side and an exit side, the conveying and support substrate forms part of an endless conveyor, the cooling system is arranged to cool the conveying and support substrate on a return path from the exit side to the entry side, and the media sheets are cooled by thermal contact with the cooled conveying and support substrate, wherein the cooling system comprises a blower, wherein the blower is arranged for blowing cold air against the conveying and support substrate.

It can be derived from US 2012/0 162 304 A1 that a dryer is configured so as to heat printed sheets in each case to 60° C. to 80° C., and a cooling device is configured to cool the sheets heated in the dryer to 15° C. to 30° C.

A printing press is known from US 2010/0 192 792 A1, comprising: a print head, which is configured to generate an ink on a printing surface, wherein the ink includes at least one element; a dryer, which, during regular operation, is configured to dry the ink applied to the printing surface, wherein the dryer is in fluid connection with an exhaust stream for exhausting the at least one element; at least one sensor, which is operatively connected to the exhaust stream of the dryer, wherein the at least one sensor is configured so as i) to determine a flow rate of the at least one element present in the exhaust stream and/or ii) to determine a moisture content of the exhaust stream and/or iii) to determine a temperature of the exhaust stream and/or iv) to identify the at least one element; and a controller functionally connected to the at least one sensor and the dryer, wherein the controller encompasses at least one program for determining a level of dryness of the ink established on the printing surface, based on a comparison of the at least one element of the exhaust stream and either i) the at least one element present in the ink prior to drying the ink on the printing surface or ii) the at least one element present in the ink after drying the ink on the printing surface or iii) a predetermined value for the at least one element.

A drying system comprising a drying module is known from JP 2015-155 091 A, wherein the drying module comprises a blower module and a guide surface delimiting the blower module in the direction of the surface of the printing substrate to be dried, wherein a fan and an air guide baffle are arranged as heating elements above the guide surface.

A drying device is known from JP H07-186 368 A, wherein a gap, in the form of an annular gap, is formed between a guide surface of the drying device and a conveyor belt of a transport device transporting the print substrate to be dried along a drying section through the drying device, wherein this gap has a gap width of up to 30 mm.

A dryer for a sheet-fed printing press can be derived from CN 1 10 884 263 A, wherein a dryer power of the dryer is adjusted by a control unit, wherein the control variable of the control carried out by the control unit for adjusting the dryer power of the dryer is a moisture content of the printed sheets to be dried.

SUMMARY

It is an object of some examples herein to provide a sheet-fed printing press comprising a dryer for drying sheets printed by a non-impact printing device, wherein an operationally safe advancement of the sheets dried in the dryer is ensured.

The object is achieved according to some examples by a dryer and cooling unit in which the cooling modules of the cooling unit are each configured as a blower module, the respective blower module being configured to guide the cooling medium in each case onto the surface of the sheets to be cooled. The respective blower module includes blower nozzles that blow the cooling medium onto the surface of the respective sheet to be cooled. The respective blower module may be configured to form, with a guide surface, a gap with respect to the surface of the sheet to be cooled. The guide surface of the respective blower module may be arranged at such a height above the surface of the sheet to be cooled that the cross-section of an outer annular gap, through which a volume flow of the cooling medium exits the gap, is smaller than or almost equal to a sum cross-section across all opening surfaces of the blower nozzles in the guide surface.

The advantages achieved with the examples herein are, in particular, that an operationally safe advancement of the sheets dried in the dryer is ensured. Further advantages are apparent from the following description.

BRIEF DESCRIPTION OF THE DRAWINGS

Exemplary embodiments of the invention are illustrated in the drawings and will be described in greater detail below. The drawings show.

DETAILED DESCRIPTION

Figure 1:
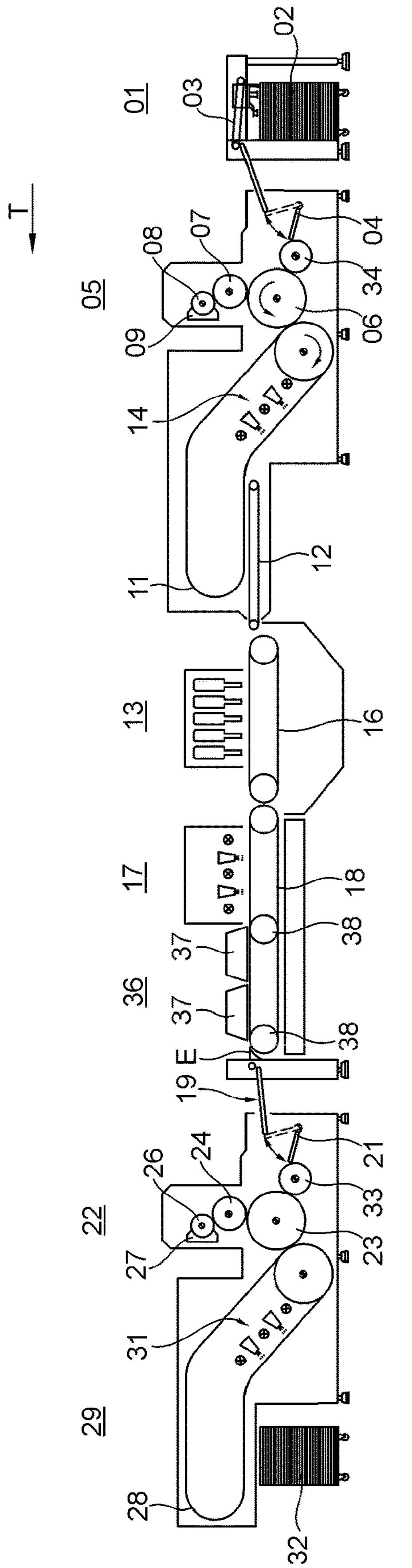
FIG. 1 a sheet-fed printing press comprising at least one non-impact printing device, a dryer, and a cooling unit.

FIG. 1 shows an example of the aforementioned sheet-fed printing press. Viewed in the transport direction T of the sheets, the sheet-fed printing press first comprises a sheet feeder 01, in which a first pile 02 of sheets is awaiting processing. The sheets are preferably rectangular substrates made of paper, paperboard, or cardboard. The paper, paperboard and cardboard differ in terms of their respective weight referred to as grammage, i.e., the weight of these sheets in grams per square meter. The grammage of paper is between 30 $g/m^2$ and 150 $g/m^2$, that of paperboard is between 150 $g/m^2$ and 600 $g/m^2$, and that of cardboard is more than 600 $g/m^2$. However, the sheets can also in each case be embodied as a substrate made of a plastic material and/or as a thin panel made of, e.g., a metallic material. The sheet feeder 01 can also be configured as a magazine feeder comprising multiple first piles 02.

A feeder head 03, which is also referred to as suction head, consecutively grips each of the stacked sheets from the top and feeds these sheets, e.g., by means of a first rocking gripper 04, and possibly a transfer drum 34 cooperating with the first rocking gripper 04, in a sequence of sheets separated from each other, e.g., to a first coating device 05, wherein this first coating device 05 is configured, e.g., as a primer application device. The first coating device 05 comprises a transport cylinder 06, configured, e.g., as a printing cylinder, and e.g., a printing unit cylinder 07 cooperating with this transport cylinder 06, comprising a forme roller 08, preferably in the form of an anilox roller, that is placed against, or at least can be placed against, this printing unit cylinder 07, wherein at least one squeegee 09 or a chamber doctor blade system 09 extends in the axial direction of the forme roller 08 for optimally metering a coating substance to be applied to the surface of the sheets. The transport cylinder 06 transports the sheets held on its outer cylindrical surface along a curved, in particular circular arc-shaped transport section. The first coating device 05 applies the coating substance, e.g., a primer, on one of the two sides of the sheets either across the entire surface area or only in certain, i.e., in previously defined, locations, i.e., partially. The sheets are then transferred from the transport cylinder 06 of the first coating device 05, e.g., by means of a preferably continuously revolving first gripper system 11, in particular a first chain conveyor, and, e.g., at least one first conveyor belt 12, to a non-impact printing device 13, wherein the first gripper system 11 and the first conveyor belt 12 cooperate during the transfer of the sheets to the non-impact printing device 13, and more particularly in such a way that the first gripper system 11 turns the sheets in each case over to the first conveyor belt 12 comprising a linear transport section, wherein a transfer of the sheets to the non-impact printing device 13 takes place from the first conveyor belt 12. The first conveyor belt 12 is preferably configured as a revolving continuous belt. In an advantageous embodiment, a first dryer 14 drying the sheets coated in the first coating device 05 is provided in the region of the first gripper system 11, wherein this dryer 14 is configured, e.g., as a hot air dryer and/or as a dryer drying by IR radiation or by UV radiation.

The non-impact printing device 13 generally comprises multiple, e.g., four, ink jet printing devices, which can each be controlled independently of one another, wherein each of these ink jet printing devices, for creating a preferably multi-color print image, in each case applies a different printing ink onto the side of the sheets which, e.g., was previously coated in the first coating device 05. The non-impact printing device 13 preferably comprises a second conveyor belt 16 in the sheet-fed printing press described by way of example here, so that the sheets are printed by the ink jet printing device while they rest on this second conveyor belt 16. The second conveyor belt 16 is preferably configured as a revolving continuous belt. A second dryer 17 drying the printed sheets is arranged downstream from the non-impact printing device 13 in the transport direction T of the sheets, wherein this second dryer 17 is likewise configured, e.g., as a hot air dryer and/or as a dryer drying by IR radiation. The second dryer 17 comprises a transport device 18, which transports the sheets lying flat in a translatory manner, i.e., along a linear transport section. This transport device 18 is configured as a third conveyor belt 18 in the sheet-fed printing press shown by way of example in FIG. 1. The third conveyor belt 18 is also preferably configured as a revolving continuous belt. The transport device 18 of the, in this example, second dryer 17 preferably transfers the dried sheets to a suction belt feed table 19, which is generally arranged directly downstream therefrom and from which the sheets are transferred, e.g., by means of a second rocking gripper 21, and possibly a transfer drum 33 cooperating with the second rocking gripper 21, to a second coating device 22. The second coating device 22 is configured, e.g., as a varnishing unit, wherein this second coating device 22 applies a coating substance, e.g., a varnish, in particular to a print image previously created in the non-impact printing device 13. The second coating device 22, in turn, comprises a transport cylinder 23 configured, e.g., as a printing cylinder, serving as the transport device for sheets to be transported, wherein, e.g., a printing unit cylinder 24 including a forme roller 26 that is placed against, or at least can be placed against, this printing unit cylinder 24, preferably in the form of an anilox roller, cooperates with this transport cylinder 23, wherein at least one squeegee 27 or a chamber doctor blade system 27 extends in the axial direction of the forme roller 26. The first conveyor belt 12 and/or the second conveyor belt 16 and/or the third conveyor belt 18 are in each case preferably configured as a revolving flat belt, and moreover preferably as a suction belt, wherein the suction belt has a perforation at least in sections.

The sheets are then transported from the transport cylinder 23 of the second coating device 22, e.g., by means of a preferably continuously revolving second gripper system 28, in particular a second chain conveyor, to a delivery 29, wherein the sheets processed in this sheet-fed printing press, described by way of example, are preferably deposited by the second gripper system 28 in the delivery 29 in a second pile 32. In an advantageous embodiment, a third dryer 31 drying the sheets coated in the second coating device 22 is provided in the region of the second gripper system 28, wherein this third dryer 31 is configured, e.g., as a hot air dryer and/or as a dryer drying by IR radiation or by UV radiation. The delivery 29 can also be configured as a multi-pile delivery comprising multiple second piles 32.

The machine system shown by way of example in FIG. 1 is configured as a digital printing press for use in an industrial printing process, in particular for mass-producing printed products. Starting at the sheet feeder 01, individual sheets are sequentially guided through this machine system forming a sheet-fed printing press to the delivery 29 at a transport speed of several thousand sheets per hour, e.g., at a transport speed in the range between 2,500 and 10,000 sheets per hour. In the process, individual sheets that are transported along at least one of the linear transport sections and adjoin one another in their transport direction T, i.e., directly follow one another in the sequence, are in each case spaced apart from each other by a gap. This gap is significantly smaller than a length of the sheets extending in the transport direction T of the sheets and is only a few millimeters, e.g., approximately 20 mm.

When passing through a dryer 17 drying, e.g., by hot air and/or by IR radiation, sheets lying flat individually on a conveyor belt 18, which were previously printed in a non-impact printing device 13, are subjected to very high heat input, as a result of which these dried sheets deform, i.e., in particular curl up, and thereby at least partially lose their flat position on the conveyor belt 18. Curling-up of the dried sheets can be so extensive that the relevant sheet loses its adhesion to the conveyor belt 18 of the dryer 17 and, when the conveyor belt 18 is configured as a suction belt, can no longer be held by means of suction force exerted at the suction belt. As a result, the relevant sheet is, at a minimum, no longer transported with positional accuracy. It is also possible for curled-up sheets provided at the exit of the dryer 17 to no longer be reliably received by a transport device arranged downstream from the dryer 17 in the transport direction T of the sheets, e.g., by the transport device of a cooling unit 36 or of a suction belt feed table 19, due to inadequate detection, which in the aforementioned machine system comprising multiple transport devices in particular very quickly results in a disruption of the operation when such sheets follow one another at a transport speed of several thousand sheets per hour, e.g., at a transport speed in the range between 2,500 and 10,000 sheets per hour. The cause of the inadequate detection of the curled-up sheets is, in particular, that the bending resistance forces inherent in the curl of the relevant sheets are not overcome by a height-dependent suction force that is exerted by a suction belt. To avoid that a print image that has previously been applied to the upper side of the relevant sheets in the non-impact printing device 13 becomes damaged, however, forcing the sheets that have curled-up, at the aforementioned locations in the machine system described here, into a flat position, e.g., by means of a mechanical hold-down device, is not an option.

The sheets that have become heated to a high degree in the dryer 17 as a result of the drying process, however, also heat the devices that ensure their advancement, in particular the conveyor belt 18 of the relevant transport device, and more particularly in some circumstances to such an extent that this conveyor belt 18 expands and consequently loses its tension and, with this, its directional stability.

Moreover, when the sheets that have been advanced and heated to a high degree in the dryer 17 as a result of the drying process cool down, condensation water precipitates on cooler, e.g., metallic, components, such as transport cylinders 38, of transport devices arranged downstream from the dryer 17. The reason is that there is increased evaporation of water and solvents contained in the applied printing ink in sheets that have been previously printed by the non-impact printing device 13 and dried in the dryer 17. This evaporation then precipitates on cold components, leading to massive condensation water, in some instances, in the machine units arranged downstream from the dryer 17, such as a suction belt feed table 19, a second processing device 22, e.g., configured as a varnishing unit, and/or the delivery 29.

As a result, the problem arises that, on the one hand, sheets printed by the non-impact printing device 13 must be dried as quickly as possibly by heat input in the dryer 17 and, on the other hand, undesirable effects due to excess thermal energy must be avoided in machine units arranged downstream from the dryer 17.

For this reason, as is illustrated in FIG. 1, it is provided to arrange a cooling unit 36 directly downstream from the dryer 17 in the transport direction T of the sheets, wherein this cooling unit 36 is either integrated into the stand of the dryer 17 or embodied in a dedicated stand, i.e., a stand separate from the dryer 17, as a self-contained machine unit. The transport device 18 of the dryer 17 configured as a conveyor belt 18 can also continuously extend through the cooling unit. Preferably, however, the cooling unit 36 is arranged in a dedicated stand and has a conveyor belt that is only assigned to the cooling unit 36 and is therefore separate from the dryer 17. At the exit of the cooling unit 36, the sheets that were heated in the dryer 17 to considerably more than 80° C. and have now been cooled, e.g., to 30° C., are preferably received by a suction belt feed table 19.

Figure 2:
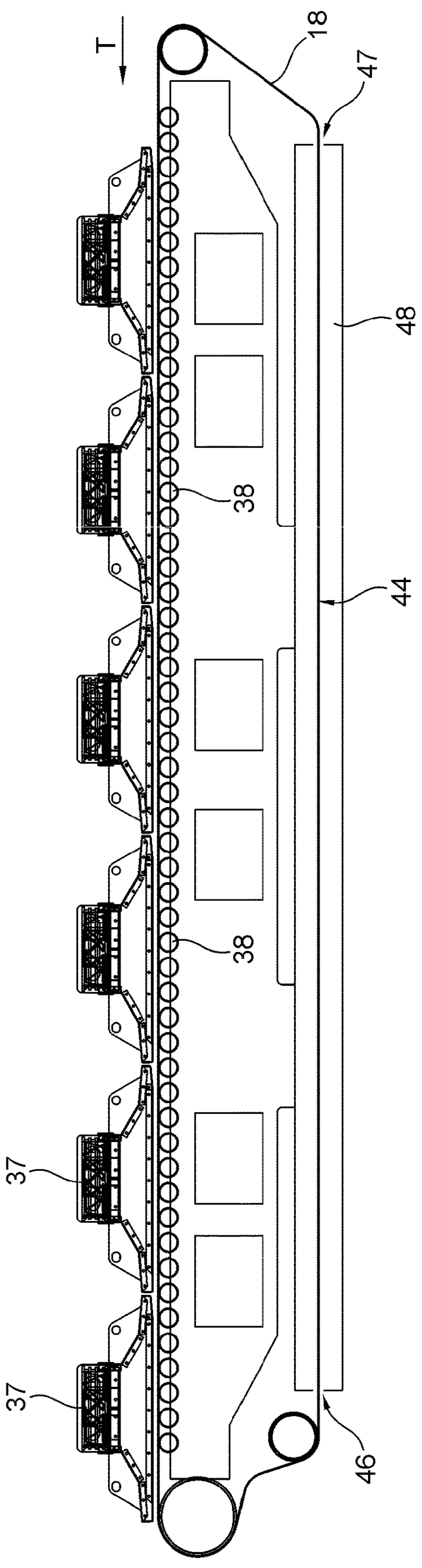
FIG. 2 a side view of the cooling unit comprising multiple cooling modules.

As can be derived from FIG. 2, which shows a side view of the cooling unit, the cooling unit 36, above a conveying plane E in which sheets are conveyed lying flat through the cooling unit 36, comprises at least one cooling module 37, preferably multiple cooling modules 37 that are continuously arranged in a row along an e.g., linear transport section. Each cooling module 37 is, e.g., removably inserted into a frame and/or arranged, together with its frame, so as to be foldable in a stand of the relevant cooling unit 36, improving the accessibility of the relevant cooling module 37, e.g., for cleaning and/or maintenance work. In particular when a transport device configured as a continuously revolving conveyor belt forms the conveying plane E for the sheets in the cooling unit 36, i.e., when the conveying plane E is preferably embodied by a conveyor belt 18 extending through the cooling unit 36, the arrangement of the relevant cooling module 37, in which it is removably inserted into a frame and/or arranged in a foldable frame, is very advantageous with respect to maintenance work of the relevant transport device and/or a possibly required removal of sheets. This conveyor belt 18 is either configured as a conveyor belt of the dryer 17 which extends through the cooling unit 36, or as a conveyor belt that is only assigned to the cooling unit 36, wherein the cooling unit 36 in the latter variant embodiment is arranged in a dedicated stand, i.e., a stand separate from the dryer 17.

Figure 3:
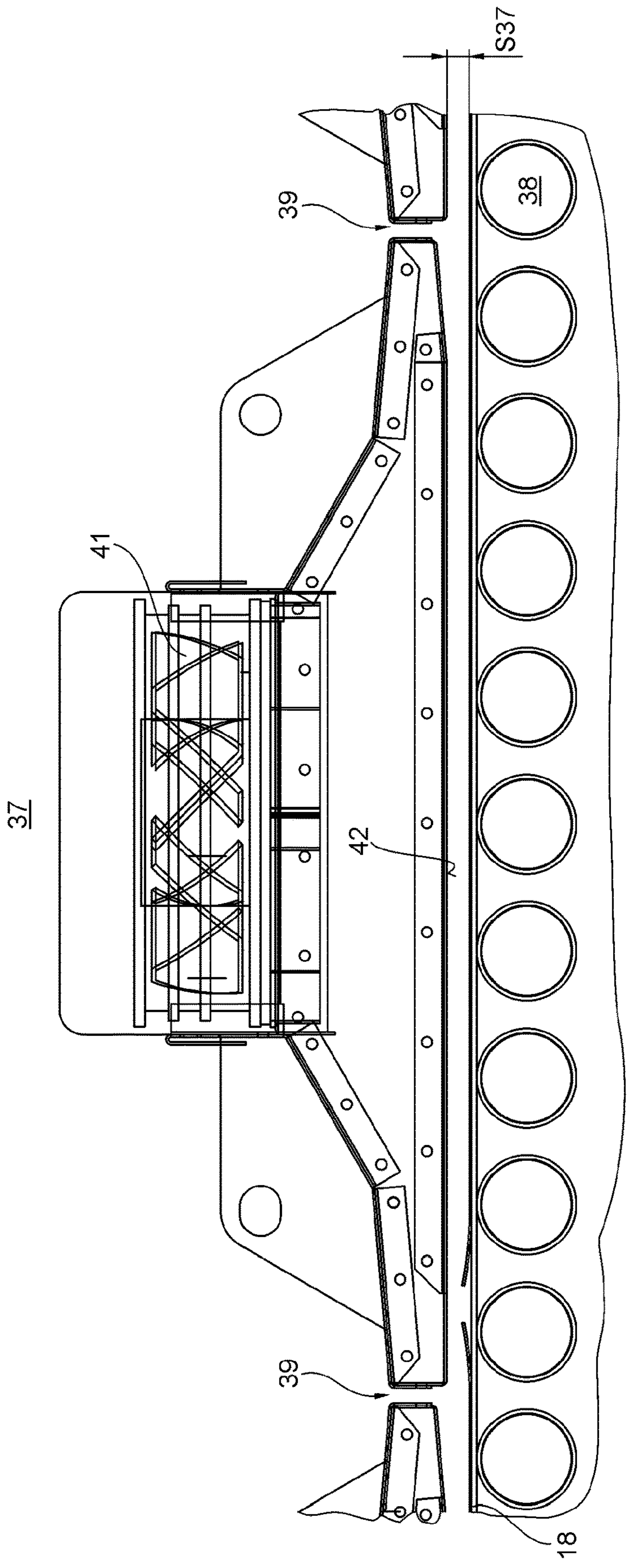
FIG. 3 an enlarged side view of a cooling module of the cooling unit.
Figure 4:
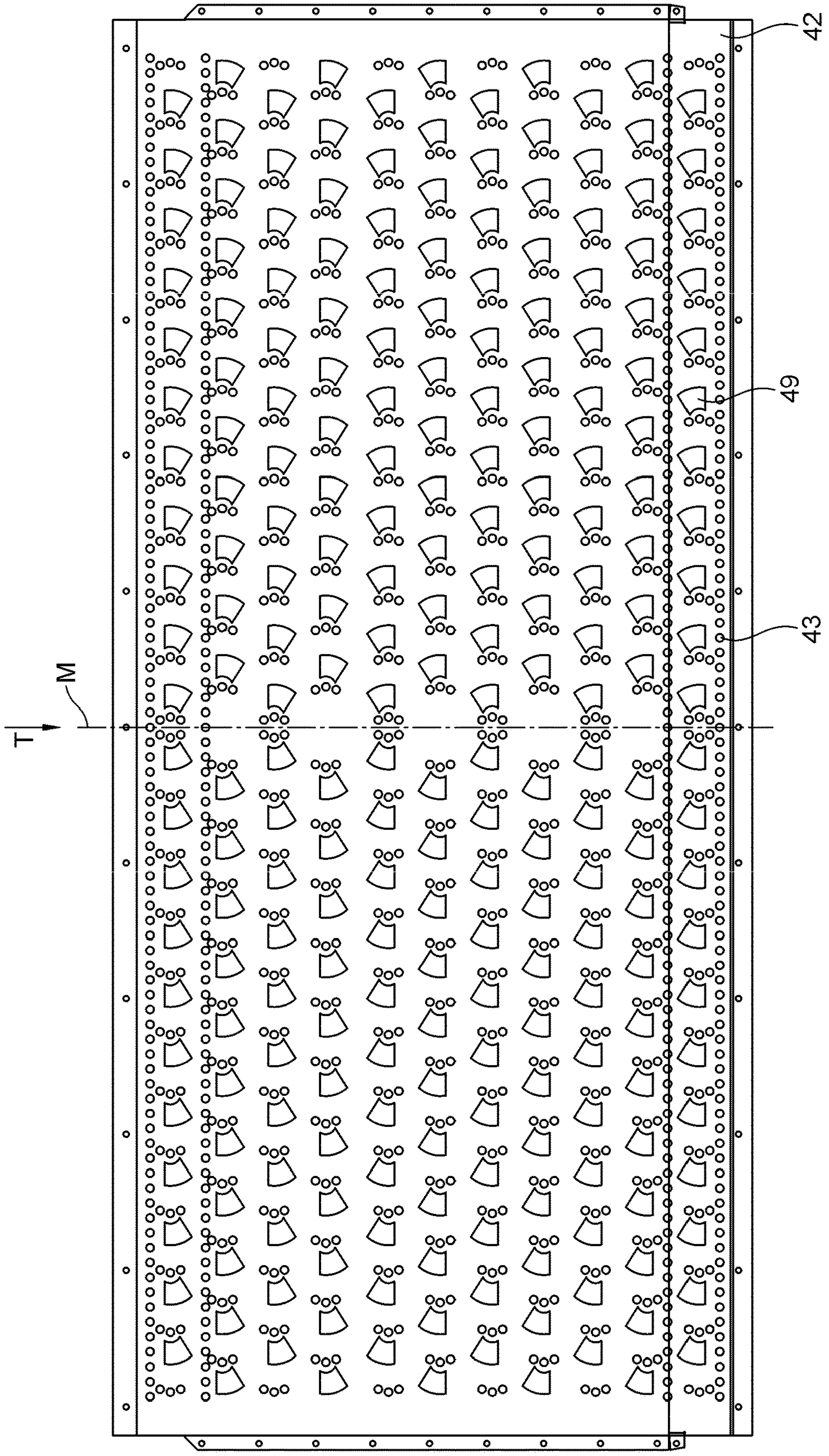
FIG. 4 a top view onto a guide surface of a cooling module of the cooling unit.

The relevant cooling module 37 is preferably configured to use air as the coolant, e.g., ambient air or cooled air. As is shown in particular in FIG. 3, each of the cooling modules 37 of the cooling unit 36 is, e.g., configured in each case as a blower module 41, wherein the respective blower module 41 is configured so as to guide the cooling medium in each case onto the surface of the sheets to be cooled. The respective blower module 41 is configured so as to form, with a guide surface 42, a narrow gap S37 with respect to the surface of the sheets to be cooled, wherein its gap width is, e.g., 8 mm to 35 mm, preferably 20 mm. It is also preferably provided that in each case cooling medium that is guided onto the surface of the sheets to be cooled passes over the surface of the sheets to be cooled as a pressure flow from the inside to the outside. Perforations, e.g., serving as blower nozzles 43 (FIG. 4), are arranged in the guide surface 42 of the respective blower module 41, wherein the cooling medium is blown by these blower nozzles 43 onto the surface of the respective sheet to be cooled. These blower nozzles 43, which in particular are configured as round nozzles, are arranged, e.g., symmetrically with respect to a center line M extending in the transport direction T of the sheets to be transported through the cooling unit 36. In addition to the blower nozzles 43, Venturi nozzles 49, e.g., can be arranged in the guide surface 42 of the respective blower module 41, which ensure a defined removal of the air that is blown in by the blower nozzles 43 and is being heated up.

The guide surface 42 of the respective blower module 41 is arranged at such a height above the surface of the sheets to be cooled that the cross-section of an outer annular gap, through which a volume flow of the coolant exits the gap S37, is less than or almost equal to the sum cross-section across all opening surfaces of the blower nozzles 43 in the guide surface 42, so that the pressure in the pressure flow is further increased, and the energy exchange with the hot surface of the sheets to be cooled is favored. The annular gap formed between the guide surface 42 of the respective blower module 41 and the surface of the sheets to be cooled thus becomes the actual constriction cross-section for the flow system of the cooling unit 36.

When the cooling unit 36 comprises a multiple arrangement of cooling modules 37 (FIG. 2), wherein these cooling modules 37 are arranged along the relevant transport section, in each case above the conveying plane E of the sheets to be cooled, joints 39 are formed between adjacent individual cooling modules 37 in such a way that the respective joint 39 for the curled-up leading edge of a sheet to be cooled, which is guided with contact in edge guidance along the respective guide surface 42, provides an, in particular step-shaped, cross-sectional expansion so that the turned-up leading edge of a sheet to be cooled can never become caught in one of the joints 39, halting the operation.

The cooling unit 36 is preferably configured so as to cool its transport device. In particular, the lower return run 44 of this conveyor belt 18 is actively cooled. For this purpose, as is apparent from FIG. 2, the lower run 44 of the conveyor belt 18 is guided through a flow space 48 that is open in the run inlet 46 and in the run outlet 47, e.g., in the form of a tunnel, so that this flow space 48 encloses the lower run 44 of the conveyor belt 18. A gaseous flow agent flows through this flow space 48, wherein this flow agent preferably flows along both the upper side and the underside of the lower run 44 of the conveyor belt 18. Preferably, cold air is blown through the flow space 48, and this cold air flows as cooling air around the lower run 44 of the conveyor belt 18. In the flow space 48, the flow direction of the flow agent, e.g., of the cooling air, is oriented counter to the running direction of the lower run 44 of the conveyor belt 18. As an alternative or in addition, it may be provided that the transport device of the cooling unit 36 which transports the sheets to be cooled comprises transport cylinders 38, wherein these transport cylinders 38 are actively cooled by a cylinder cooling mechanism using, e.g., water as the cooling medium.

In a very advantageous embodiment of the cooling unit 36, its cooling power is adjusted by a control unit, wherein the control variable of the control carried out by this control unit for adjusting the cooling power is a temperature of the sheets in the pile 32 of the delivery 29. The control unit carries out a target/actual value comparison, wherein the actual value is provided by a temperature sensor in the delivery 29 at the control unit, and the target value is fixedly or adjustably predefined at the control unit. The control unit then outputs an adjustment increment specification to at least one actuator providing the cooling power of the cooling unit 36, as a function of the target/actual value comparison that was carried out.

Moreover, it may be provided that a dryer power of the dryer 17 arranged upstream from the cooling unit 36 is adjusted by a control unit, wherein the control variable of the control carried out by the control unit for adjusting the dryer power of the dryer 17 is, e.g., a moisture content of the printed sheets to be dried. The control unit, in turn, carries out a target/actual value comparison, wherein the actual value is provided by a moisture sensor, detecting the moisture content of the sheets, at the control unit, and the target value is fixedly or adjustably predefined at the control unit. The control unit then outputs an adjustment increment specification to at least one actuator providing the dryer power of the dryer 17, as a function of this further target/actual value comparison that was carried out. Since this dryer 17 is configured, e.g., as a hot air dryer and/or as a dryer drying by IR radiation, a control variable for adjusting this dryer power is, e.g., the amount of hot air that is blown in and/or the temperature of the blown-in hot air and/or the intensity of the IR radiation and/or the duration of the IR radiation. The control unit is preferably configured so as to calculate at least one of the aforementioned control variables and the associated adjustment increments with respect to their respective magnitude and/or their respective direction of action and/or so as to select at least one of the aforementioned control variables and the associated adjustment increments based on an algorithm or a family of characteristics stored in the control unit.

The above-described cooling unit 36 arranged directly downstream from the dryer 17 is configured so as to reduce the surface temperature of the printed sheets dried in the dryer 17 and reduce a residual moisture that remains in the sheets. As a result, the curl of the sheets is decreased, and the sheets regain a flat position that is much easier to process. The sheets processed in the cooling unit 36 then introduce almost no thermal energy into downstream machine units. This also reduces condensation formed at components in downstream machine units.

To additionally improve also the efficiency of the dryer 17 arranged upstream from the cooling unit 36, and thereby the efficiency of the entire above-described sheet-fed printing press, measures are described hereafter for shortening the drying time required by the dryer 17 for drying the sheets printed in the sheet-fed printing press, and thereby speeding up production with the sheet-fed printing press or reducing the energy input required for the drying process.

Figure 5:
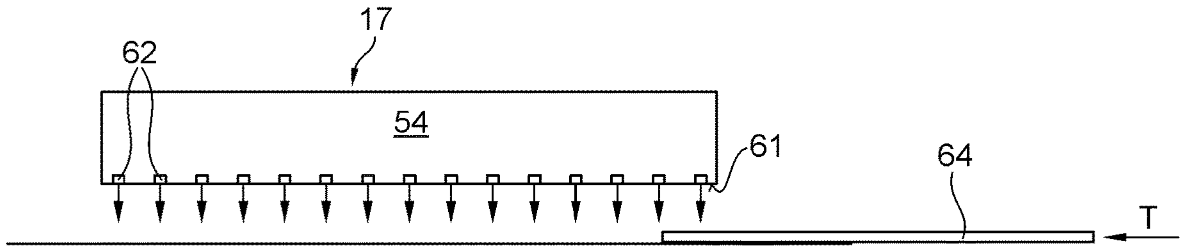
FIG. 5 a drying module of the dryer arranged in the sheet-fed printing press downstream from the non-impact printing device.

As is apparent from the representative illustration in FIG. 5, the dryer 17 arranged in a sheet-fed printing press is configured in the form of at least one drying module 54, wherein the relevant drying module 54, on its side facing the surface of the sheet 64 to be dried and moved through the sheet-fed printing press in the transport direction T, comprises a guide surface 61, which extends across, e.g., a linear drying section, and has a multiplicity of nozzles 62, wherein each of these nozzles 62 in each case has an opening cross-section through which the hot air flows or at least can flow. In particular, an edge of a sheet 64 that is curled up from the flat position, i.e., turned-up, can be guided along the drying section through the dryer 17, at the guide surface 61 of the dryer 17. In the sheet-fed printing press printing and/or varnishing sheets 64, which is preferably configured as a digital printing press, the drying section of the dryer 17 is preferably configured to be planar and linear. The sheets 64 are preferably transported lying flat on at least one conveyor belt along the planar conveying section.

Figure 6:
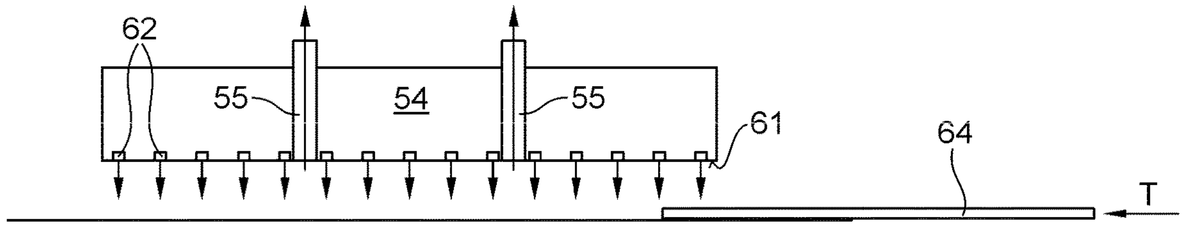
FIG. 6 a drying module of this dryer having introduced channels.

For forming a stream of the hot air flowing out of the nozzles 62, as is indicated in each case by directional arrows in FIGS. 5 and 6, different nozzles 62 having differently shaped opening cross-sections can be employed as needed and/or simultaneously, so as to remove by doctoring the moist air, by way of the pulse of the hot air jet, in the boundary layer directly above the surface of the sheet 64 to be dried, i.e., to remove it to as great an extent as possible, but at least to swirl it and thereby ensure an air exchange at the surface of the sheet 64 to be dried. In this way, the employed nozzles 62, which are arranged in or at the guide surface 61, are configured, e.g., as round nozzles or as slot-shaped nozzles or as Venturi nozzles.

Figure 7:
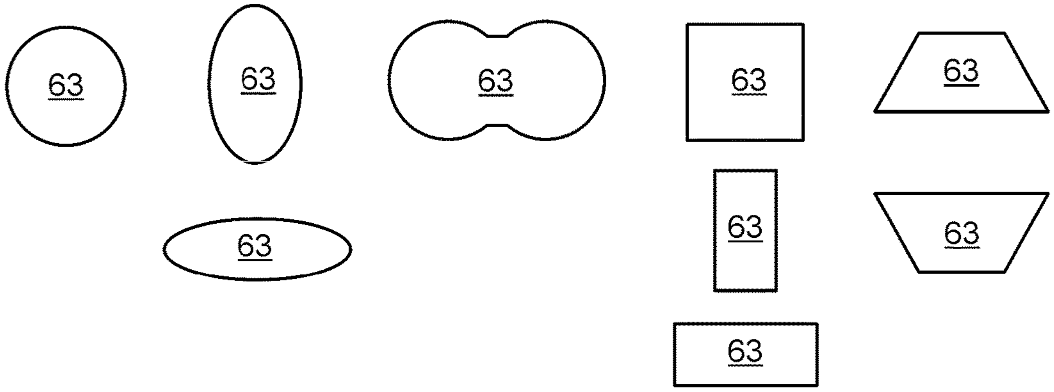
FIG. 7 different cross-sectional surfaces of infrared radiation sources.
Figure 8:
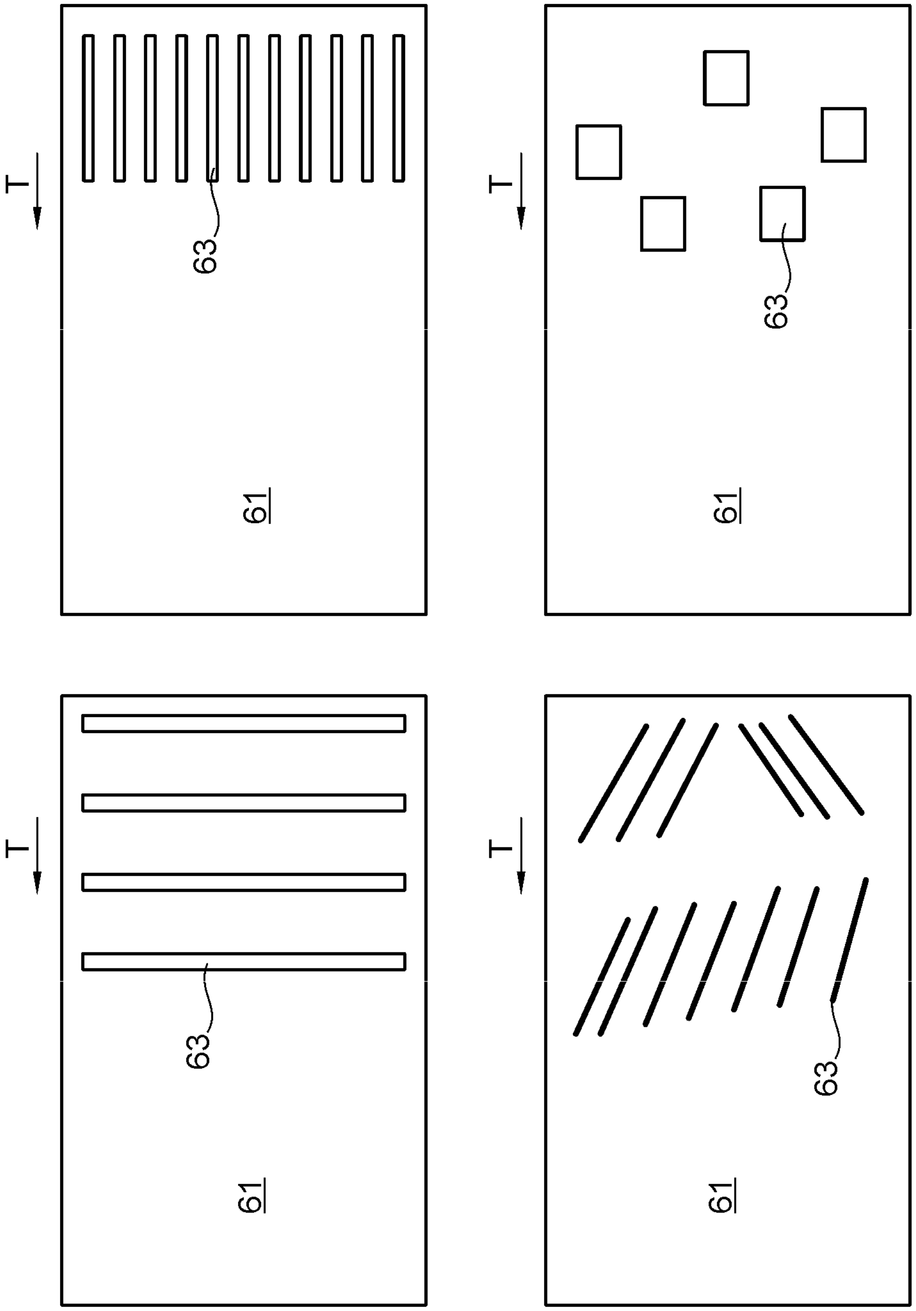
FIG. 8 various arrangements of the infrared radiation sources.

It is possible, e.g., to use infrared emitters comprising a heating coil arranged in a glass tube or infrared halogen emitters comprising a heating coil arranged in a glass tube filled with halogen, as a radiation source 63 for an infrared radiation emitted by the dryer 17. Panel heaters comprising heating elements arranged in a planar manner are also suitable. A cross-sectional surface of such infrared radiation sources 63 is, e.g., configured in the form of a circle or an oval or as a twin tube or as a square or as a trapezoid, such as the different representations of the cross-sectional surface in FIG. 7 show by way of example. FIG. 8, by way of example, shows different arrangements of the infrared radiation sources 63. For example, the infrared radiation sources 63 can be arranged in the guide surface 61, e.g., transversely or longitudinally or obliquely with respect to the transport direction T of the moved sheet 64 or in the form of tiles.

Figure 9:
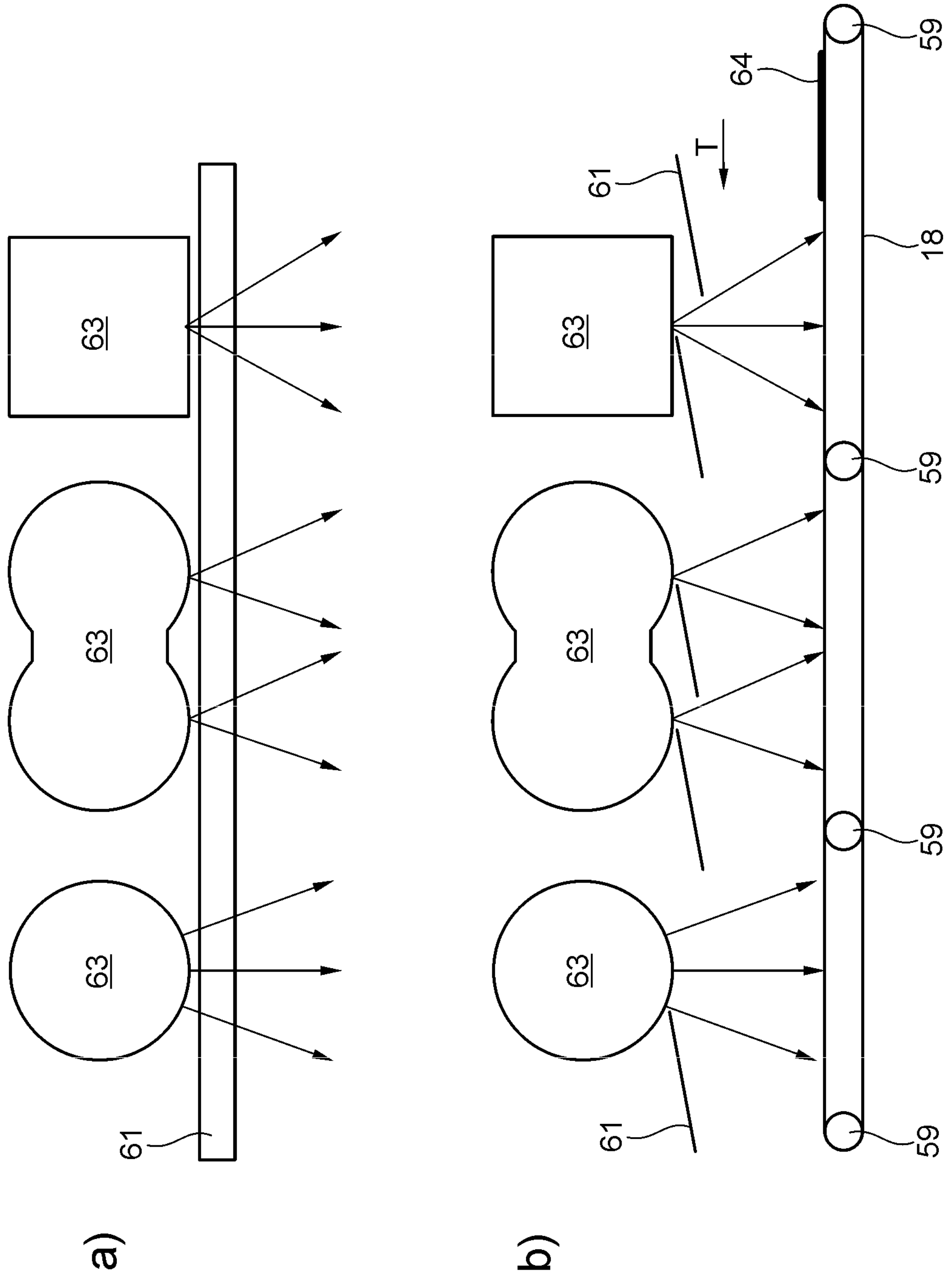
FIG. 9 different designs for integrating the infrared radiation sources into the dryer.

FIG. 9, by way of example, shows two different designs for integrating the infrared radiation sources 63 into the relevant drying module 54 of the dryer 17. In the embodiment a) shown only schematically in FIG. 9, at least a portion of the guide surface 61 of the dryer 17 is made of e.g., glass, and is thus transmissive to infrared radiation, so that the infrared radiation emitted by the infrared radiation sources 63, as indicated by directional arrows, can penetrate the guide surface 61 of the dryer 17 in the direction of the sheet 64 to be dried. In the embodiment b) likewise shown only schematically in FIG. 9, at least a portion of the guide surface 61 of the dryer 17 is made of, e.g., a metallic material, e.g., a metal sheet, and thus does not allow infrared radiation to pass through, so that the guide surface 61 of the dryer 17 has apertures through which the infrared radiation emitted by the infrared radiation sources 63, as indicated by directional arrows, can radiate in the direction of the surface of the sheet 64 to be dried. In this second variant embodiment, it is important that the apertures are kept narrow, and the leading edge of the aperture is spaced a larger distance apart from the conveyor belt than the trailing edge of the aperture, so that a curled-up sheet leading edge, moving in edge guidance along the guide surface 61, cannot become caught at the leading edge of the aperture.

The hot air flowing onto the surface of the moved sheet 64 flows out through a gap opening formed between the guide surface 61 of the dryer 17 and the surface of the sheet 64 to avoid an accumulation of air, wherein this gap opening is configured, e.g., in the form of an annular gap. Additionally, it is also possible, e.g., for multiple channels 55 having a preferably circular cross-section to be introduced in the drying module 54 of the dryer 17 (FIG. 6), through which the moist air in the boundary layer directly above the surface of the sheet 64 to be dried is partially extracted. The channels 55 for partially extracting the moist air in the boundary layer directly above the surface of the sheet 64 to be dried are arranged in the guide surface 61 of the dryer 17, preferably in its edge regions extending parallel to the transport direction T of the moved sheet 64, which also has a positive effect on a guidance of the moved sheet 64 in correct positional arrangement along the drying section of the dryer 17. The drying process, which is caused by the radiant energy emitted by infrared radiation sources 63 primarily heating the surface of the sheet 64, but also causes heating with subsiding effect in its depth, is considerably supported by the described gap opening flow since, on the one hand, a volume flow of hot air that is heated to a considerably greater extent is provided at the surface of the sheet 64 to be dried and, on the other hand, the heat-moisture exchange between the moist surface of the sheet 64 to be dried and the gap flow is favored by the convection, which is expanded by pressure as a physical state variable, and thus by velocity. As a result, the dryer 17 becomes more efficient, while all energy input variables remain the same.

The dryer 17 preferably comprises multiple drying modules 54 that are continuously arranged in a row along an, e.g., linear transport section. Each of these drying modules 54 is arranged closely, e.g., above the transport device, configured as a continuously revolving conveyor belt, of the dryer 17 that is arranged directly downstream from the non-impact printing device 13 in the transport direction T of the sheets.

Figure 10:
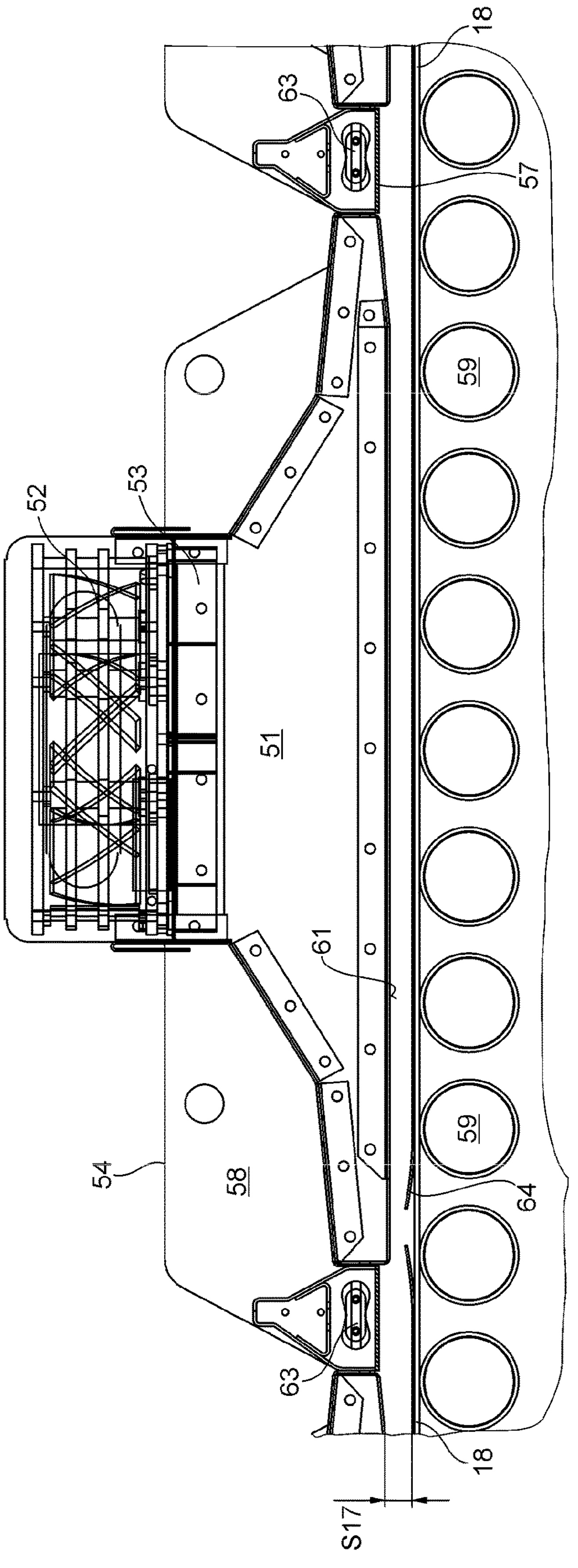
FIG. 10 a drying module comprising an integrated infrared radiation source.

FIG. 10 shows a single one of the drying modules 54 arranged in the dryer 17. Above the guide surface 61, each of the drying modules 54 generally comprises a blower module 51 and an, in particular heat-resistant, fan 52 and an air guide baffle 53, serving as a heater element, wherein the heating element is used to heat the air that is caused to flow by the fan 52. Each sheet 64 to be dried is guided in a gap S17 extending between the guide surface 61 of the dryer 17 and the conveyor belt 18, wherein transport cylinders 59, e.g., supporting the conveyor belt, are arranged beneath the conveyor belt 18. The gap S17, which is in particular embodied as an annular gap, has a gap width between, e.g., 8 mm and 35 mm, preferably between 10 mm and 20 mm. In an embodiment that is not shown, at least one infrared radiation source 63, which is directed at the surface of the sheet 64 to be dried, is arranged in each case in a joint between drying modules 54 that are continuously arranged in a row adjacent to one another in the transport direction T of the sheets 64. On its side that is directed at the surface of the sheet 64 to be dried, the relevant infrared radiation source 63 is in particular covered in each case, e.g., with a protective glass 57, for guiding an edge of the sheet 64 that is curled up from the flat position, i.e., turned up. FIG. 10 shows a preferred embodiment of the drying modules 54, in which the respective infrared radiation source 63 directed in each case at the surface of the sheet 64 to be dried is integrated in a housing 58 of the relevant drying module 54. In a refinement of the previously illustrated drying module 54, an, in particular meander-shaped, beam trap is arranged in the flow path between the fan 52 and the air guide baffle 53, so that the fan 52 and the air guide baffle 53 are thermally decoupled.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A sheet-fed printing press comprising:

a dryer (17) that dries sheets (64) printed by a non-impact printing device (13), the dryer (17) configured as a hot air dryer and/or as a dryer drying by infrared (IR) radiation, and a cooling unit (36) arranged directly downstream from the dryer (17) in a transport direction (T) of the sheets (64), the cooling unit (36) comprising at least one cooling module (37) above a conveying plane (E) in which the sheets (64) are conveyed through the cooling unit (36) lying flat, and the at least one cooling module (37) configured to use air as a cooling medium, characterized in that each at least one cooling module (37) of the cooling unit (36) includes a respective blower module (41), the respective blower module (41) configured to guide the cooling medium onto surfaces of the sheets (64) to be cooled, the respective blower module (41) comprising a plurality of blower nozzles (43), the cooling medium being blown through the plurality of blower nozzles (43) onto a surface of a respective sheet (64) to be cooled, the respective blower module (41) configured to form, with a guide surface (42), a space (S37) between the guide surface (42) and the surface of the respective sheet (64) to be cooled, the space between the guide surface (42) of the respective blower module (41) and the surface of the relevant sheet (64) to be cooled arranged such that a cross-section of an outer annular gap formed by the space (S37), and through which a volume flow of the cooling medium exists, is smaller than or almost equal to a sum cross-section across all opening surfaces of the blower nozzles (43) in the guide surface (42) to provide a pressurized flow of the cooling medium across the surface of the respective sheet (64) to be cooled as the cooling medium passes from the nozzles (43) and exits the annular gap.

2. The sheet-fed printing press according to claim 1, characterized in that the gap (S37) formed with the guide surface (42) with respect to the surface of the relevant sheet (64) to be cooled has a gap width of 8 mm to 35 mm.

3. The sheet-fed printing press according to claim 1, characterized in that a transport device comprising a conveyor belt is provided, this conveyor belt configured to transport the printed sheets (64) individually lying flat and forming the conveying plane (E) for the sheets (64) to be conveyed lying flat through the cooling unit (36).

4. The sheet-fed printing press according to claim 1, characterized in that the respective blower module (41) is configured in such a way that the cooling medium that is guided onto the surface of the sheets (64) to be cooled passes over the surface of the sheets (64) to be cooled as a pressure flow from the inside to the outside.

5. The sheet-fed printing press according to claim 1, characterized in that the blower nozzles (43) of the relevant blower module (41) are in each case arranged symmetrically with respect to a center line (M) extending in the transport direction (T) of the sheets (64) to be transported through the cooling unit (36) and/or that, in addition to the blower nozzles (43), Venturi nozzles (49) are arranged in the guide surface (42) of the respective blower module (41), the Venturi nozzles (49) ensuring a defined removal of the air that is blown in by the blower nozzles (43) and is being heated up.

6. The sheet-fed printing press according to claim 1, characterized in that the dryer (17) is configured to heat the printed sheets (64) in each case to more than 80° C., and the cooling unit (36) is configured to cool the sheets (64) heated in the dryer (17) to 30° C.

7. The sheet-fed printing press according to claim 3, characterized in that the conveyor belt (18) is configured to transport the printed sheets (64) individually lying flat through the cooling unit (36) on a run running in the transport direction (T) of the sheets (64), the cooling unit (36) configured so as to cool the return run (44) of the conveyor belt (18) transporting the sheets (64).

8. The sheet-fed printing press according to claim 1, characterized in that the transport device of the cooling unit (36) comprises transport cylinders (38), these transport cylinders (38) being cooled by a cylinder cooling mechanism.

9. The sheet-fed printing press according to claim 1, characterized in that a cooling power of the cooling unit (36) is adjusted by a control unit.

10. The sheet-fed printing press according to claim 9, characterized in that a dryer power of the dryer (17) arranged upstream from the cooling unit (36) is adjusted by the control unit, the control variable of the control carried out by the control unit for adjusting the dryer power of the dryer (17) being a moisture content of the printed sheets (64) to be dried, a control variable for adjusting the dryer power being the amount of hot air that is blown in and/or the temperature of the blown-in hot air and/or the intensity of the IR radiation and/or the duration of the IR radiation.

11. The sheet-fed printing press according to claim 10, characterized in that the control unit is configured so as to carry out a target/actual value comparison, the relevant actual value being provided by a moisture sensor, detecting the moisture content of the sheets (64), at the control unit, and the target value being fixedly or adjustably predefined at the control unit.

12. The sheet-fed printing press according to claim 1, characterized in that the dryer (17), on its side facing the surface of the respective sheets (64) to be dried, comprises a guide surface (61) that is arranged spaced apart from the surface of these sheets (64) and has a multiplicity of nozzles (62), each of these nozzles (62) in each case having an opening cross-section through which hot air flows or at least can flow.

13. The sheet-fed printing press according to claim 2, characterized in that the hot air flowing onto the surface of the sheets (64) flows out through a gap opening formed between the guide surface (61) and the surface of the sheets (64), the surface area of the gap opening through which the hot air flowing onto the surface of the sheets (64) flows out being smaller than the total surface area of all opening cross-sections of the nozzles (62) directing hot air at the surface of the sheets (64).

14. The sheet-fed printing press according to claim 1, characterized in that the dryer (17) comprises multiple drying modules (54) that are continuously arranged in a row in the transport direction (T) of the sheets (64), at least one infrared radiation source (63) that is directed at the surface of the relevant sheet (64) to be dried being arranged in each case between adjacent drying modules (54).

15. The sheet-fed printing press according to claim 12, characterized in that a gap (S17), in the form of an annular gap, is formed along a drying section, which is formed between the guide surface (61) of the dryer (17) and the conveyor belt (18) of the dryer (17), for sheets (64) to be transported through the dryer (17) and to be dried, this gap (S17) having a gap width between 8 mm and 35 mm.

* * * * *